United States Patent
Niu et al.

(10) Patent No.: US 7,715,803 B2
(45) Date of Patent: May 11, 2010

(54) METHODS AND APPARATUS FOR CONSTANT-POWER LOADING ASYMMETRIC ANTENNA CONFIGURATION

(75) Inventors: Huaning Niu, Santa Clara, CA (US); Jyh Chau Horng, Saratoga, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1146 days.

(21) Appl. No.: 11/314,928

(22) Filed: Dec. 20, 2005

(65) Prior Publication Data

US 2007/0270173 A1     Nov. 22, 2007

(51) Int. Cl.
*H04B 1/46* (2006.01)
(52) U.S. Cl. .................. 455/82; 455/83; 455/13.3; 455/13.4; 455/25; 375/299; 375/296
(58) Field of Classification Search .............. 455/82, 455/83, 13.3, 13.4, 25, 562.1, 575.7, 506; 375/299, 296, 219, 260
See application file for complete search history.

(56) References Cited

U.S. PATENT DOCUMENTS

| | | | | |
|---|---|---|---|---|
| 5,119,042 | A * | 6/1992 | Crampton et al. ........... 330/295 |
| 6,144,711 | A * | 11/2000 | Raleigh et al. .............. 375/347 |
| 6,377,631 | B1 * | 4/2002 | Raleigh ....................... 375/299 |
| 6,452,981 | B1 * | 9/2002 | Raleigh et al. .............. 375/299 |
| 6,754,286 | B2 * | 6/2004 | Hottinen et al. ............. 375/299 |
| 6,763,237 | B1 * | 7/2004 | Katz ........................... 455/450 |
| 6,888,899 | B2 * | 5/2005 | Raleigh et al. .............. 375/299 |
| 7,020,482 | B2 | 3/2006 | Medvedev et al. |
| 7,072,692 | B1 * | 7/2006 | Katz et al. ................ 455/562.1 |
| 7,139,328 | B2 | 11/2006 | Thomas et al. |
| 7,145,971 | B2 * | 12/2006 | Raleigh et al. .............. 375/347 |
| 7,203,249 | B2 * | 4/2007 | Raleigh et al. .............. 375/299 |
| 7,286,609 | B2 | 10/2007 | Maltsev et al. |
| 7,336,727 | B2 | 2/2008 | Mukkavilli et al. |
| 7,340,009 | B2 * | 3/2008 | Giannakis et al. ........... 375/299 |
| 7,466,670 | B2 * | 12/2008 | Anderson et al. ........... 370/312 |
| 7,525,988 | B2 | 4/2009 | Kim |
| 7,542,515 | B2 * | 6/2009 | Li et al. ...................... 375/260 |

(Continued)

OTHER PUBLICATIONS

G. Foschini, Layered space-time architecture for wireless communication in a fading environment when using multi-element antennas, Bell Labs Tech. J., vol. 1, No. 2, 1996.

(Continued)

*Primary Examiner*—Minh D Dao
(74) *Attorney, Agent, or Firm*—Kenneth L. Sherman, Esq.; Michael Zarrabian, Esq.; Myers Andras Sherman LLP

(57) ABSTRACT

A method and system for constant-power loading for asymmetric antenna configurations. The sounding packet, the sounding bit in HT-SIG field, and the HT-LTF field in the PLCP protocol data unit (PPDU) are used to determine the number of transmit antennas and the number of data streams, wherein if the number of transmission streams is the same as the number of data streams, then a first set of power loading level (fixed uneven power loading) is applied, otherwise a second set of power loading level is applied. Alternatively, one additional bit in the HT-SIG filed of PLCP protocol data unit (PPDU) signaling field is used to signal the set of power loading level used.

20 Claims, 6 Drawing Sheets

U.S. PATENT DOCUMENTS

| | | | |
|---|---|---|---|
| 7,548,751 | B2 | 6/2009 | Katori et al. |
| 7,555,060 | B2 | 6/2009 | Raleigh et al. |
| 2002/0009156 | A1* | 1/2002 | Hottinen et al. ............. 375/267 |
| 2003/0072382 | A1* | 4/2003 | Raleigh et al. .............. 375/267 |
| 2005/0047517 | A1 | 3/2005 | Georgios et al. |
| 2006/0045193 | A1 | 3/2006 | Stolpman et al. |
| 2006/0072677 | A1* | 4/2006 | Kwak et al. ................. 375/260 |
| 2006/0104379 | A1 | 5/2006 | Li et al. |
| 2006/0120469 | A1 | 6/2006 | Maltsev et al. |
| 2006/0140290 | A1 | 6/2006 | Li et al. |
| 2006/0176993 | A1* | 8/2006 | Kwun et al. ................ 375/367 |
| 2006/0234750 | A1 | 10/2006 | Horng et al. |
| 2006/0234751 | A1 | 10/2006 | Horng et al. ................. 455/522 |
| 2007/0019754 | A1* | 1/2007 | Raleigh et al. .............. 375/260 |
| 2007/0147534 | A1 | 6/2007 | Horng et al. ................. 372/260 |
| 2007/0153934 | A1 | 7/2007 | Horng et al. ................. 375/260 |
| 2007/0258411 | A1* | 11/2007 | Trigui ........................ 370/335 |
| 2007/0270173 | A1 | 11/2007 | Niu |
| 2008/0232485 | A1* | 9/2008 | Niu et al. .................... 375/260 |

OTHER PUBLICATIONS

V. Tarokh, N. Seshadri, and A. R. Calderbank, "Space-time codes for high data rate wireless communications: Performance criterion and code construction," IEEE Trans. Inform. Theory, vol. 44, pp. 744-765, Mar. 1998.

L. Zheng and D. Tse, "Diversity and multiplexing: a fundamental tradeoff in multiple-antenna channels," IEEE Trans. Info. Theory, vol. 49, May 2003.

F. R. Farrokhi, G. J. Foschini, A. Lozano, and R. A. Valenzuela, "Link-optimal space-time processing with multiple transmit and receive antennas," IEEE Comm. Letters, vol. 5, March 2001.

H. Sampath, P. Stoica, and A. Paulraj, "Generalized linear procoder and decoder design for MIMO channels using the weighted MMSE criterion," IEEE Trans. Comm., vol. 49, Dec. 2001.

A. Scaglione, P. Stoica, S. Barbarossa, G. B. Giannakis, and H. Sampath, "Optimal design for space-time linear precoders and decoders," IEEE Trans. Signal Processing, vol. 50, May 2002.

S.A. Mujtaba, "TGn Sync Proposal Technical Specification," a contribution to IEEE 802.11, 11-04-889r1, Nov. 2004, pp. 1-143.

S.A. Mujtaba, "TGn Sync Proposal Technical Specification," a contribution to IEEE 802.11, 11-04-889r7, Jul. 2005, pp.

S.A. Mujtaba, "TGn Sync Proposal Technical Specification," a contribution to IEEE 802.11, 11-04-889r0, Aug. 2004, pp. 1-135.

John Ketchum etc., "System Description and Operating Principles for High Throughput Enhancements to 802.11", doc.: IEEE 802.11-04/0870r0, Aug. 2004, pp. 1-136.

U.S. Non-Final Office Action mailed Jun. 9, 2008, for U.S. Appl. No. 11/110,346.

U.S. Final Office Action mailed Nov. 28, 2008, for U.S. Appl. No. 11/110,346.

U.S. Non-Final Office Action mailed Feb. 5, 2009, for U.S. Appl. No. 11/110,346.

U.S. Non-Final Office Action mailed Jun. 5, 2008, for U.S. Appl. No. 11/110,337.

U.S. Final Office Action mailed Dec. 26, 2008, for U.S. Appl. No. 11/110,337.

U.S. Non-Final Office Action mailed Nov. 28, 2008, U.S. Appl. No. 11/317,410.

Van Veen, B., Buckley, K., "Beamforming: A Versatile Approach to Spatial Filtering," IEEE ASSP Magazine, Apr. 1988, pp. 4-24, U.S.

Shiu, D.S.; Foschini, G.J.; Gans, M.J.; Kahn, J.M., "Fading Correlation and its Effect on the Capacity of Multielement Antenna Systems," IEEE Trans. Communication, Mar. 2000, pp. 502-513, vol. 48, No. 3., U.S.

Cover, T. and Thomas, J., "Elements of Information Theory," Aug. 1991, pp. 250-256, John Wiley, New York.

Erceg, V. et al., "TGn Channel Models," a contribution to IEEE 802.11-03/940r2, Jan. 2004, pp. 1-44, U.S.

U.S. Non-Final Office Action for U.S. Appl. No. 11/321,267 mailed Oct. 1, 2008.

U.S. Final Office Action for U.S. Appl. No. 11/321,267 mailed Feb. 19, 2009.

U.S. Advisory Action for U.S. Appl. No. 11/321,267 mailed Apr. 27, 2009.

U.S. Non-Final Office Action for U.S. Appl. No. 11/321,267 mailed Jul. 7, 2009.

* cited by examiner

Transmitter operation on power loading  600

Receiver operation on power loading  610

METHODS AND APPARATUS FOR CONSTANT-POWER LOADING ASYMMETRIC ANTENNA CONFIGURATION

FIELD OF THE INVENTION

The present invention relates generally to data communication, and more particularly, to data communication in multi-channel communication system such as multiple-input multiple-output (MIMO) systems.

BACKGROUND OF THE INVENTION

A multiple-input-multiple-output (MIMO) communication system employs multiple transmit antennas in a transmitter and multiple receive antennas in a receiver for data transmission. A MIMO channel formed by the transmit and receive antennas may be decomposed into independent channels, wherein each channel is a spatial sub-channel (or a transmission channel) of the MIMO channel and corresponds to a dimension. The MIMO system can provide improved performance (e.g., increased transmission capacity) if the additional dimensionalities created by the multiple transmit and receive antennas are utilized.

MIMO increases system link robustness and spectral efficiency. To optimize spectral efficiency for MIMO system, many efforts have been made, which can be broadly classified into two categorists: open-loop approaches and closed-loop approaches. The open-loop approaches include spatial multiplexing, space-time coding and the tradeoff therebetween them. The closed-loop approaches focus on maximizing the link capacity, which results in a "water-filling" solution, and on minimizing the weighted MMSE which provides an "inverse water-filling" solution.

In an open-loop MIMO system, the MIMO transmitter has no prior knowledge of the channel condition (i.e., channel state information). As such, space-time coding techniques are usually implemented in the transmitter to combat fading channels. In a closed-loop system, the channel state information (CSI) can be fed back to the transmitter from the receiver, wherein some pre-processing can be performed at the transmitter in order to separate the transmitted data streams at the receiver side.

Such techniques are referred to as beamforming techniques, which provide better performance in desired receiver's directions and suppress the transmit power in other directions. Beamforming techniques are considered for IEEE 802.11n (high throughput WLAN) standard. Closed-loop eigen-beamforming generally provides higher system capacity compared with the closed loop solution, assuming the transmitter knows the down-link channel. Singular value decomposition (SVD) based eigen-beamforming decomposes the correlated MIMO channel into multiple parallel pipes.

When applying the closed loop approach to MIMO-OFDM, the optimal solution requires a bit loading and power loading per OFDM subcarrier, i.e., adapting the transmitted signal x and the power loading matrix P simultaneously per subcarrier. In order to simplify the complexity, conventional approaches propose: (1) adapting coding/modulation and power level across all subcarriers (described in S. A. Mujtaba, "TGn Sync Proposal Technical Specification", a contribution to IEEE 802.11, 11-04-889rl, November 2004 (incorporated herein by reference)), (2) fixing coding/modulation for all data streams and only adjusting the power level, and (3) fixing coding/modulation and the power loading level (unequal) for all OFDM symbols. The first approach provides the highest throughput with the most implementation complexity. In the second approach above, different levels of power quantization with auto-detection have been evaluated, with 2 level quantization recommended. Such methods are robust for different antenna configurations, channel condition etc., but result in higher cost due to receiver complexity (auto-detection is required). In order to further simplify the receiver complexity, the third approach above proposes 1-bit (const) power loading has been utilized. Since constant power loading is used, no auto-detection is needed. However, such an approach only works well when transmitter and receiver antennas are symmetric. In case of asymmetric transmission, constant power loading leads to performance degradation.

An uneven power loading detection approach, wherein auto-detection at the receiver is not necessary with adaptive power loadings, has also been proposed. However, the receiver must implement an Upper-triangular Decomposition (UD) in addition to the MMSE MIMO detection. Therefore, this approach cannot be used for dummy receivers without beamforming capability. A dummy receiver is the receiver with minimum complexity and only support basics MIMO detection. For example, only general MMSE linear detection, not SVD or UD kind of particular matrix operation.

BRIEF SUMMARY OF THE INVENTION

In one embodiment, the present invention provides a method and system for constant-power loading for asymmetric antenna configurations. The sounding packet, the sounding bit in HT-SIG field, and the HT-LTF field in the PLCP protocol data unit (PPDU) are used to determine the number of transmit antennas (Ntx) and the number of data streams (Nss), wherein if Ntx=Nss, then a first set of constant power loading levels (e.g., fixed uneven power loading) is selected; otherwise, (i.e., Ntx>Nss), the eigen-modes with the Nss largest eigenvalues are selected, whereby a second set of constant power loading levels (e.g., a different fixed power loading level) is selected. Such a method and system is simple and flexible, without requiring additional bits and auto-detection.

In another embodiment, the present invention provides a method and system for constant-power loading for asymmetric antenna configurations, which utilizes one additional bit to be transmitted in the HT-SIG field of PLCP protocol data unit (PPDU). The codebook of the power level is redesigned and the selection is signaled in the HT-SIG field. In one example, a codebook with "0" is utilized to represent one level of uneven power loading (e.g., 0.3:1.7) and "1" to represent another level of slightly uneven power loading (e.g., 0.7:1.3). This information is signaled in the HT-SIG field, wherein the receiver uses this information to perform the corresponding power loading and packet detection.

Accordingly, the present invention provides constant-power loading for asymmetric antenna configurations in MIMO systems. The power loading approaches according to the present invention work well for both Ntx>Nss and Ntx=Nss scenarios. Two sets of power loading levels are provided without requiring auto-detection, thereby simplifying the complexity of the receiver. Further, by adopting two sets of power loading levels, system parameters of a MIMO system according to the present invention are more robust compared to conventional constant power loading approaches. In addition, for receivers without the capabilities of performing SVD/UD, the present invention provides an alternative to auto-detection to determine uneven power loadings at the receiver.

These and other features, aspects and advantages of the present invention will become understood with reference to the following description, appended claims and accompanying figures.

DETAILED DESCRIPTION OF THE INVENTION

Figure 1:
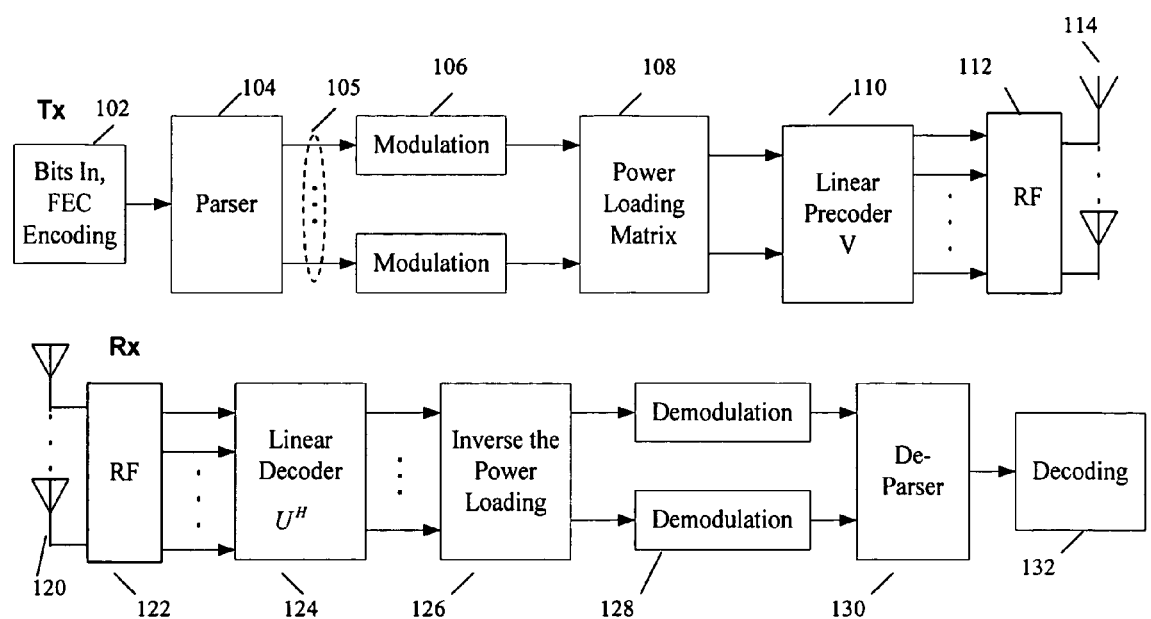
FIG. 1 shows an example block diagram of an SVD beamforming MIMO system implementing an embodiment of the present invention.

Singular value decomposition (SVD) based eigen-beamforming decomposes the correlated MIMO channel into multiple parallel pipes. FIG. 1 shows a block diagram of an example MIMO system 100 having a transmitter TX and a receiver RX, in which the present invention is implemented. As described further below, the system 100 implements different power loading values than the conventional approaches. In the system 100 the transmitter TX includes a forward error correction (FEC) encoder 102, a parser 104, multiple modulation units 106, a power loading unit 108, a precoder unit 110, RF unit 112 and transmit antennas 114. The receiver RX includes receive antennas 120, RF unit 122, linear decoder 124, inverse power loading unit 126, multiple demodulation units 128, a de-parser 130 and a FEC decoder 132.

For the transmitter TX, in the unit 102 the source bit stream is encoded by a channel encoder and a puncturer punctures the bits to change the coding rate. The spatial parser 104 separates the data stream into several (two or more) spatial streams 105. The constellation mapper 106 groups/maps the bits into symbols using a Gray Mapping Rule. The power loading unit 108 loads different power in each spatial stream according to the power loading algorithm. The precoder 110 provides steering the packet using V matrix. In the RF modulator 102, the signal is RF modulated and transmitted through the strongest channel via antennas.

In the receiver RX, the receiving antennas 120 receive the signals, and the received signals are sampled and down-converted to base-band digital signal in the unit 122. The decoder 124 performs linear MIMO detection. The unit 126 applies inverse power loading according to the power loading algorithm. The multiple demodulators 128 perform constellation de-mapping, demap the constellation point to soft bit information. The deparser 130 de-multiplex multiple data streams back to one decoding stream for Viterbi decoding. And the decoder 132 performs the Viterbi decoding.

The example system 100 has Nss data streams, Nt transmit antennas 114 and Nr receive antennas 120 (Nss<Min(Nr, Nt)), and implements a transmission model according to relation (1) below:

$$y = HVPx + n \quad (1)$$

wherein x is the Nss×1 transmitted signal vector, P is a Nss×Nss diagonal matrix with loading power $\alpha_i$ along the diagonal, V is the $N_t \times Nss$ right singular vector matrix corresponding to the Nss largest eigen values, H is a $N_r \times N_t$ channel response which can be factored using SVD as $H = UDV^H$, and n is $N_r \times 1$ additive noise vector in the channel.

As shown in FIG. 1, in the transmitter TX, the information bit stream is parsed into Nss streams by the parser 104. At the receiver RX, the received signal y is multiplied by the left singular vector matrix $U^H$ in the linear decoder unit 124, followed by multiplication of the inversed power level $(DP)^{-1}$ in the inverse power loading unit 126 such that the received signal after processing, $X_p$, can be expressed according to relation (2) below:

$$X_p = (DP)^{-1} U^H y = x + (DP)^{-1} U^H n \quad (2)$$

When applying the closed-loop approach to MIMO-OFDM, the optimal solution for maximizing the transmission capacity requires a bit loading and power loading per OFDM subcarrier, i.e., adapting x and P simultaneously per subcarrier. The third conventional approach above addresses symmetric transmission, wherein the transmitter and receiver antennas are symmetric. In case of asymmetric transmission, such approach leads to performance degradation. For example, when Ntx is greater than Nss, conventionally the eigen-modes with the largest Nss eigenvalues are selected. Because in this case the difference of the eigenvalues is much smaller compared with the case where Ntx=Nss case, applying the same set of uneven power loading degrades the performance for asymmetric transmission.

According to an embodiment of the present invention, different power loading values are used in the power loading unit 108 of system 100 than the conventional approaches. In one example implementation of the present invention, a constant-power loading approach for asymmetric antenna configurations is utilized. Such an approach is simple and flexible, without requiring additional bits and power loading auto-detection. In another example implementation of the present invention, a constant-power loading approach for asymmetric antenna configurations is utilized wherein one additional bit is transmitted in the HT-SIG field. HT-SIG is the signal field defined for high rate IEEE 802.11n transmission. Transmission parameters such as the length of the packet, the coding and modulation used, etc., are signals in the HT-SIG field known to those of ordinary skill in wireless local area networking (WLAN).

An example of constant-power loading according to an embodiment of the present invention involves applying a first set of power loading for symmetric transmission, and applying a second set of power loading for asymmetric antenna configuration. Two example implementations described below provide ways to let the receiver know the power loading used in transmitting a packet received by the receiver, such that the receiver can correctly decode the received packet.

First Embodiment

In the first example implementation according to the present invention, antenna information is based on the beamforming protocol, where sounding is performed before the start of the beamforming transmission.

In the following description AP represents a WLAN access point, and STA represents a WLAN client. In general, as shown by example in FIG. 4, the beamforming protocol includes a Calibration Protocol 401 and a Beamforming Transmission Protocol 402. The AP needs to be calibrated first before any beamforming transmission. The details of the Calibration Protocol 401 are diagrammatically shown by example in the event diagram 500 of FIG. 5 between an AP and an STA, wherein first, the AP sends a request for calibration to the STA. Then, the STA performs calibration training and send sounding packet to the AP. Then, the AP estimates the unlink channel, performs calibration training and sends a sounding packet to the STA. The, STA estimates the downlink channel and sends the downlink channel back to the AP.

Figure 5:
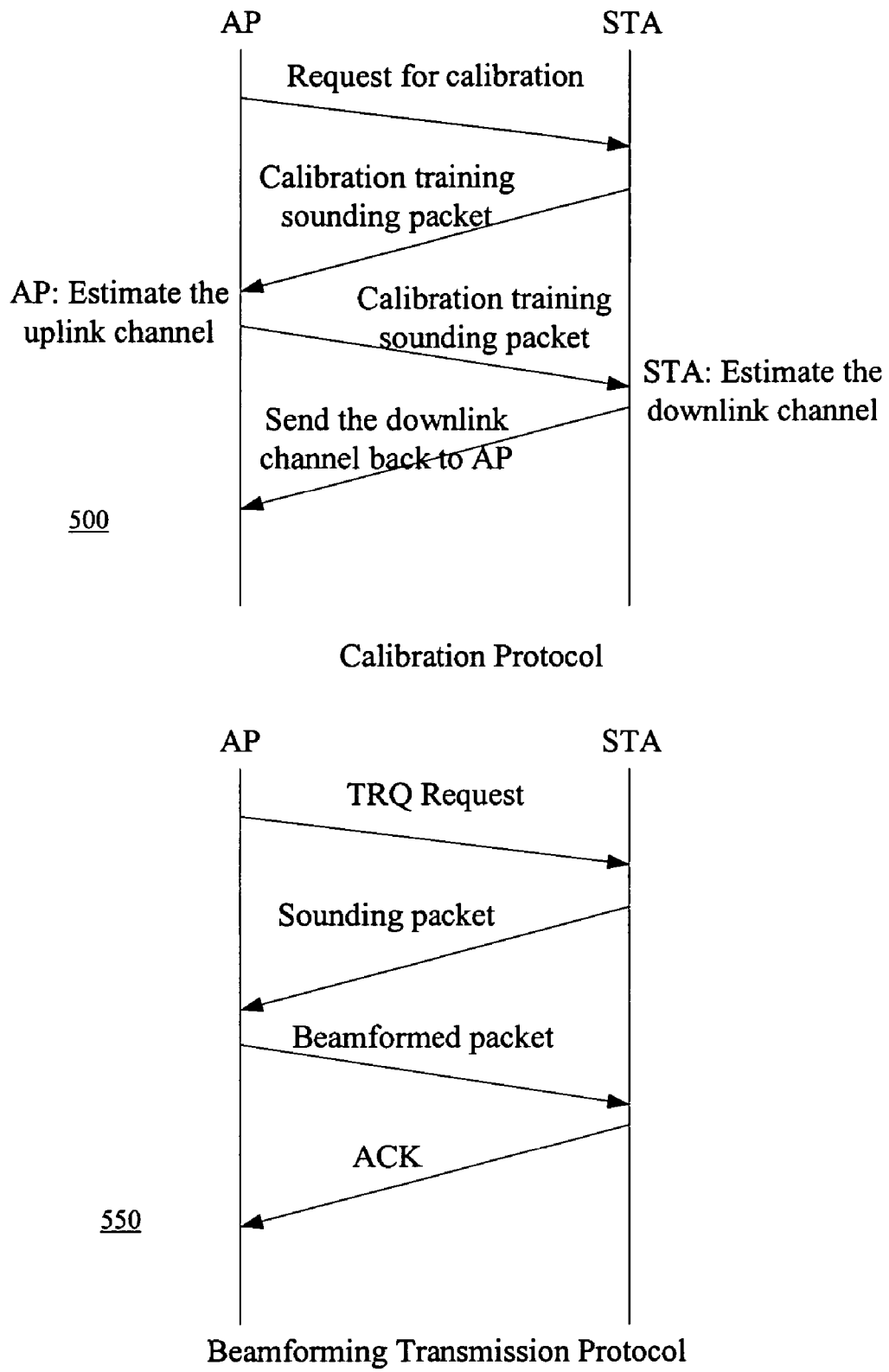
FIG. 5 shows an example calibration protocol and an example beamforming transmission protocol, according to an embodiment of the present invention.

The details of the Beamforming Transmission Protocol 402 are also shown by example in the event diagram 550 of FIG. 5 between an AP and a STA, wherein first, the AP sends a timing request (TRQ) to the STA. Then, the STA sends a sounding packet to the AP. Then, the AP sends a beamformed packet to the STA. Then, the AP sends an acknowledgment (ACK) to the AP.

Figure 4:
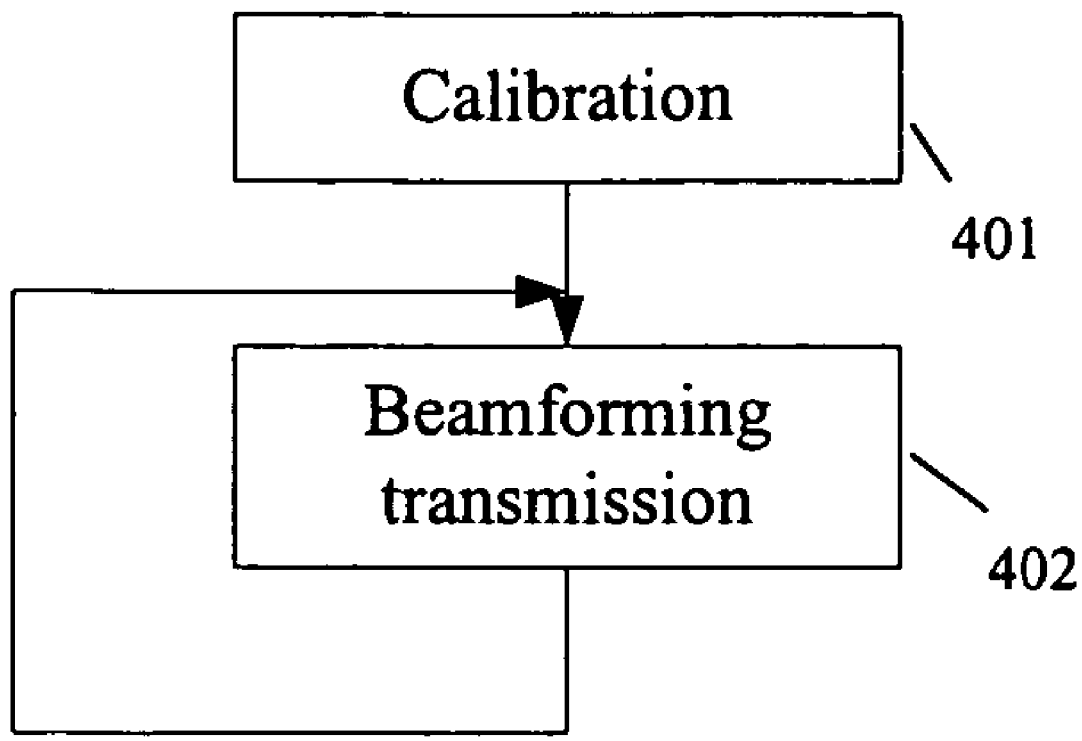
FIG. 4 shows an example flowchart of calibration and beamforming transmission according to an embodiment of the present invention.

Further, as shown in FIG. 4, the calibration step 401 is performed regularly, with large time intervals. Multiple beamforming transmissions 402 can be performed after each calibration 401. As such, the STA (e.g., receiver RX in FIG. 1) obtains the number of transmit antennas based on the sounding packet that AP (e.g., the transmitter TX in FIG. 1) transmitted for calibration. The STA also obtains the number of transmitted spatial data streams based on current packet transmission in the data transmission stage. If the number of transmit antennas is the same as the number of spatial data streams, then a first set of power loading level (e.g., power level 1) is utilized in transmitting data packets, otherwise, a second set power loading level (e.g., power level 2) is utilized in transmitting data packets.

The sounding packet, the sounding bit in HT-SIG field, and the HT-LTF field in the PLCP protocol data unit (PPDU) format in S. A. Mujtaba, "TGn Sync Proposal Technical Specification", a contribution to IEEE 802.11, 11-04-889rl, November 2004, are used to determine the Ntx and Nss, wherein if Ntx=Nss, then a first set of power loading level (e.g., fixed uneven power loading) is selected; otherwise if Ntx>Nss, then the eigen-modes with the Nss largest eigenvalues are selected, whereby a second set of power loading level (e.g., a different fixed power loading level) is selected. Such a method and system is simple and flexible, without requiring additional bits and power loading auto-detection.

Figure 2:
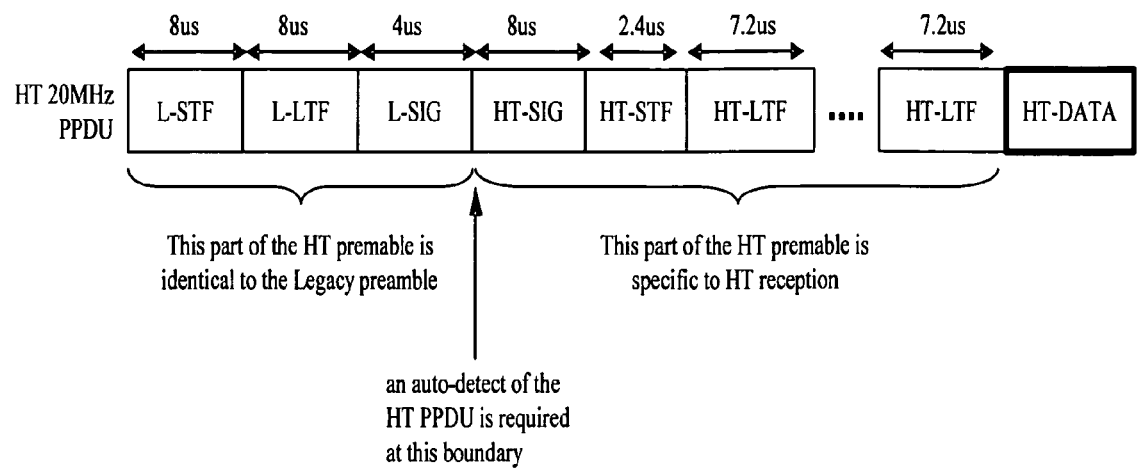
FIG. 2 shows the PPDU format for transmission parameters of the system of FIG. 1.

FIG. 2 shows the TGn Sync PLCP protocol data unit (PPDU) format (TGn Sync specification is described in publication by S. A. Mujtaba etc, "TGn Sync Proposal Technical Specification", doc.: IEEE 802.11-04/0889r7, draft proposal, July 2005, incorporated by reference). The HT-LTF fields in the PPDU are used to estimate the steered channel information. The number of HT-LTF fields is equal to Ntx in a sounding packet (where the sounding bit in HT-SIG is set to 1), and equals Nss during packet transmission (where the sounding bit in HT-SIG is set to 0).

Figure 3:
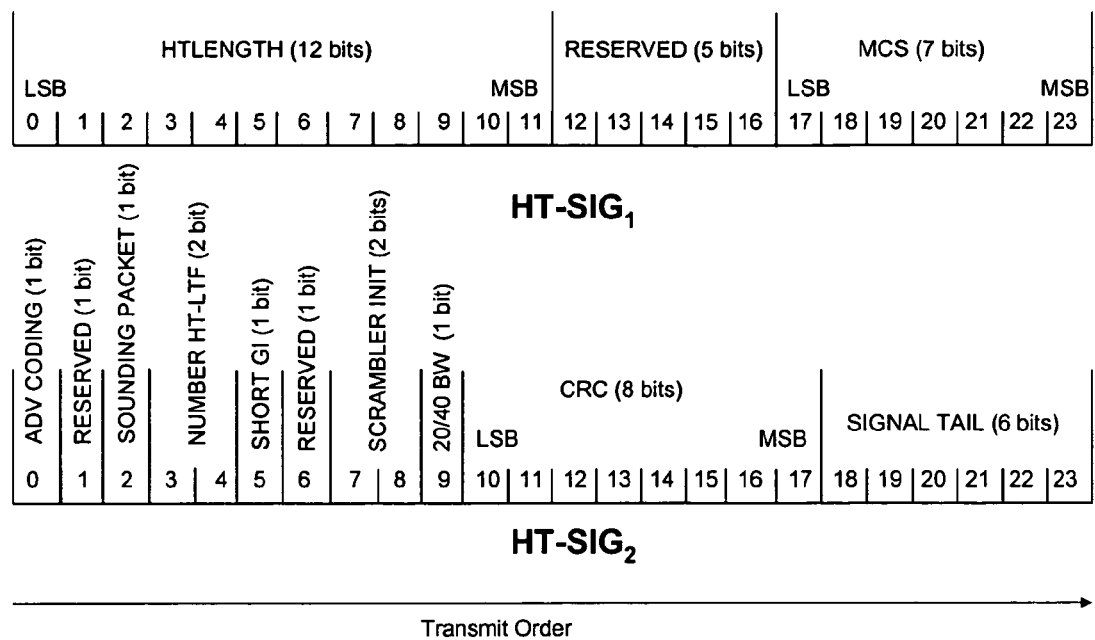
FIG. 3 shows the HT-SIG field bit assignment of the PPDU format in FIG. 2.

The HT-SIG field is specified in FIG. 3, which supports the usage of the sounding packet by setting the sounding bit in the HT-SIG field to 1. Since the sounding packet is transmitted at the beginning of any beamforming operation by the transmitter TX, the receiver RX will know the number of the transmit antennas (which is the same as the number of HT-LTF).

Because during data transmission, the number of HT-LTF fields is equal to Nss, the receiver RX can compare Ntx and Nss. Depending on the comparison of Nss and Ntx, different sets of uneven power loading levels are applied by the inverse power loading unit 126 in the receiver RX. The appropriate power loading level depends on the channel condition and the antenna spacing. In one example, the appropriate power loading level is determined by computing the mean of the power loading level for each transmitter-receiver Ntx and Nss configuration. Examples of such calculations are provided in commonly-assigned patent application Ser. No. 11/110,346, filed Apr. 19, 2005, titled "Power Loading Method and Apparatus for Throughput Enhancement in MIMO systems"; and "Constant uneven power loading in beamforming systems for high throughput WLAN communications", (incorporated herein by reference). Once the power level is specified, the receiver RX just needs to choose one out of the two choices based on Nss and Ntx.

Second Embodiment

Figure 6:
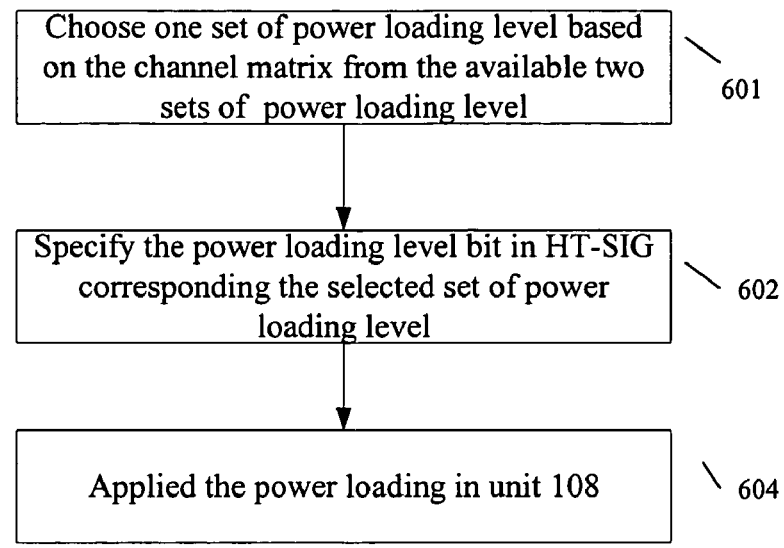
FIG. 6 shows flowcharts of example steps for transmitter operation on power loading, and example steps for receiver operation on power loading, according to an embodiment of the present invention.
Figure 6:
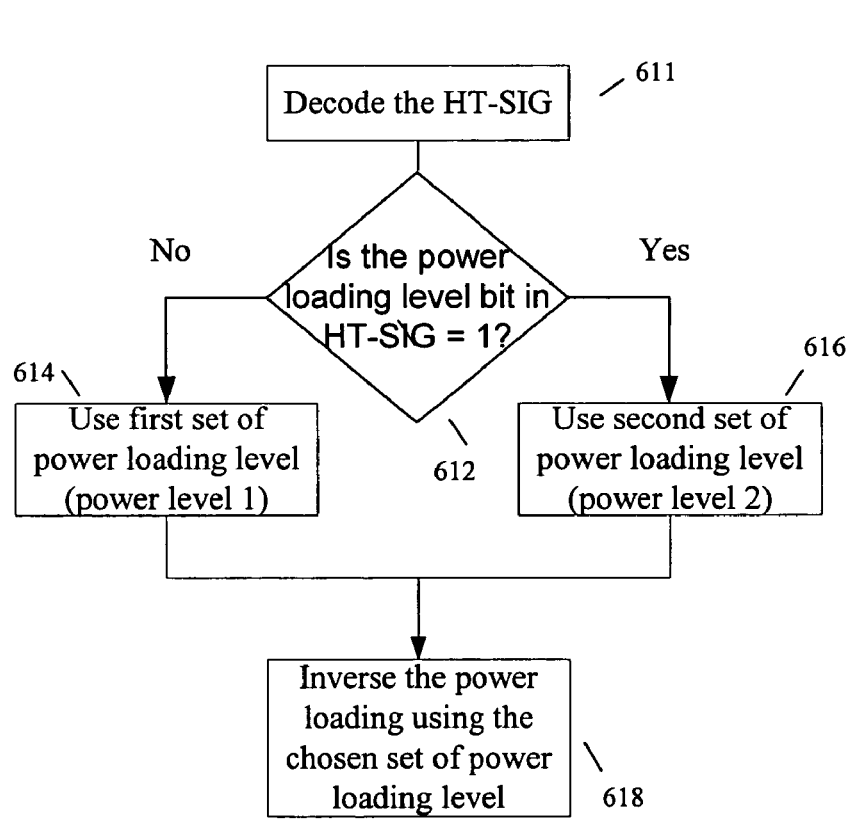

In the second example implementation according to the present invention, the power level information is obtained using an extra bit in the signaling field. FIG. 6 shows flowchart 600 of example steps 601-604 for transmitter operation on power loading, and example flowchart 610 of steps 611-618 for receiver operation on power loading. The power level information is obtained using an extra bit in the signaling field (i.e., extra bit in the HT-SIG field of PLCP protocol data unit (PPDU)), wherein if the extra bit is 0, a first set of power loading level is used (e.g., power level 1), and if the extra bit is 1, then a second set of power loading level (e.g., power level 2) is used.

The codebook of the power level is redesigned such as described by example in the above-mentioned commonly assigned patent applications. The selection of power level is signaled in the HT-SIG field. In one example, a codebook with "0" is utilized to represent the first set of power loading (e.g., 0.3:1.7) and "1" to represent the second set of power loading (e.g., 0.7:1.3). This information is signaled in the HT-SIG field, wherein the receiver RX uses this information to perform the corresponding detection in the inverse power loading unit 126 in the receiver RX.

Both the transmitter TX and the receiver RX in FIG. 1 determine and use power loading information. In the transmitter TX, the power loading unit 108 performs power loading, and in the receiver RX, the inverse power unit 126 performs inverse of the power loading effect. Accordingly, as shown in the flowchart 600 FIG. 6, the transmitter TX operation on power loading includes the steps of: choosing one set of power loading levels based on the channel matrix from the available two sets of power loading levels (step 601), specifying the power loading level bit in HT-SIG field corresponding to the selected power loading set (step 602), and applying the power loading in the power loading unit 108 (step 604). As shown in the flowchart 610 of FIG. 6, the receiver RX operation on power loading includes the steps of: decoding the HT-SIG field (step 611), determining if the power loading level bit in the HT-SIG field is 0 or 1 (step 612), if the power loading level bit is 0 then select power level 1 (step 614), otherwise if the power loading level bit is 1 then select power level 2 (step 616), and applying inverse power loading using in the unit 126 using the selected power level (step 616).

The second implementation above can manage not only the case where Ntx>Nss, but also the case where the access point has large antenna separations and full scattering environment (i.e., almost uncorrelated fading channel), at the cost of an additional signal bit in the HT-SIG field. However, additional bits in the HT-SIG field are available due to the change of the definition of HTLENGTH in the unit of OFDM symbols (instead of the previous octets).

Further, for receivers without the capabilities of performing SVD/UD, the present invention provides an alternative to auto-detection to determine uneven power loadings at the receiver. Specifically, Ntx information is also exchanged during association between AP and STA (i.e., AP is a WLAN access point, and STA is a WLAN client). If the STA does not have the capability to obtain the Ntx information from the sounding packet, then the STA needs to remember the Ntx during association.

Accordingly, the present invention provides a method and system for constant-power loading for asymmetric antenna configurations. The power loading approaches according to the present invention work well for both Ntx>Nss and Ntx=Nss scenarios. The present invention uses a table of two sets of power loading levels which depend on the actual environment and the optimal number that can be found by experiment (e.g., following the method of the two above-mentioned commonly assigned patent applications) without requiring auto-detection of power loading, thereby simplifying the complexity of the receiver RX. Further, by adopting two sets of power loading levels, system parameters of a MIMO system according to the present invention are more robust compared to conventional constant power loading approaches. In addition, for receivers without the capabilities of performing SVD/UD, the present invention provides an alternative to auto-detection to determine uneven power loadings at the receiver.

The present invention has been described in considerable detail with reference to certain preferred versions thereof; however, other versions are possible. Therefore, the spirit and scope of the appended claims should not be limited to the description of the preferred versions contained herein.

What is claimed is:

1. A telecommunication system, comprising:
a wireless transmitter that transmits data streams via multiple channels over a plurality of antennas to a receiver, the transmitter including a power controller that selects a set of constant power loading levels for asymmetric antenna configuration based on antenna information, wherein the antenna information is obtained based on a beamforming protocol including sounding before the start of a beamforming transmission, and the number of transmit antennas is obtained based on a sounding packet.

2. The system of claim 1 wherein the transmitter comprises is a MIMO transmitter.

3. The system of claim 1 wherein the transmitter informs the receiver of the power loading level such that the receiver decodes a transmitted packet.

4. The system of claim 1 wherein the receiver obtains the number of transmit antennas based on a sounding packet transmitted by the transmitter.

5. The system of claim 4 wherein the number of data streams is obtained based on current packet transmission.

6. The system of claim 5 wherein if the number of transmit antennas is the same as the number of data streams, then the power loading controller utilizes a first set of power loading level, otherwise, the power loading controller utilizes a second set of power loading level.

7. The system of claim 6 wherein the transmitter informs the receiver of the power loading level such that the receiver decodes a transmitted packet, wherein the power level information is obtained using an extra bit in the signaling field.

8. The system of claim 6 wherein if the extra bit is 0, then a first set of power loading level is used, and if extra bit is 1 then a second set of power loading level is used.

9. The system of claim 5 wherein if the number of transmit antennas (Ntx) is same as the number of data streams (Nss), then the power loading controller utilizes fixed uneven power loading; otherwise if the number of transmit antennas is greater than the number of data streams then the eigen-modes with the Nss largest eigenvalues are selected as power loading determination.

10. A closed-loop signaling method over multiple channels in a telecommunication system including a transmitter and a receiver, comprising:
obtaining an information bit stream;
obtaining antenna information based on a beamforming protocol including sounding before the start of a beamforming transmission;
selecting the number transmission streams;
determining transmission power loading per channel as for asymmetric antenna configuration; and
transmitting the information bit stream from the transmitter via said multiple channels over a plurality of transmit antennas to the receiver according to the power loading levels,
wherein the number of transmit antennas is obtained based on a sounding packet.

11. The method of claim 10 wherein the telecommunication system comprises is a MIMO system.

12. The method of claim 10 further including informing the receiver of the power loading level such that the receiver decodes a transmitted packet.

13. The method of claim 10 further including the receiver obtaining the number of transmit antennas based on a sounding packet transmitted by the transmitter.

14. The method of claim 13 further including obtaining the number of data streams based on current packet transmission.

15. The method of claim 14 further including determining if the number of transmit antennas is the same as the number of data streams, and if so, then utilizing a first set of power loading level, otherwise, utilizing a second set of power loading level.

16. The method of claim 15 further including the transmitter informing the receiver of the set of power loading level used such that the receiver decodes a transmitted packet, wherein the power level information is obtained using an extra bit in the signaling field.

17. The method of claim 15 wherein if the extra bit is 0, then a first set of power loading level is used, and if extra bit is 1 then a second set of power loading level is used.

18. The method of claim 14 wherein if the number of transmit antennas (Nix) is same as the number of data streams (Nss), then fixed uneven power loading is utilized, otherwise if the number of transmit antennas is greater than the number of data streams then the eigen-modes with the Nss largest eigenvalues are selected as power loading determination.

19. An apparatus, comprising:
a wireless transmitter that transmits data streams via multiple channels over a plurality of antennas, the transmitter including a power controller that selects a set of constant power loading levels for asymmetric antenna configuration based on information of the plurality of antennas,
wherein the information of the plurality of antennas is obtained based on a beamforming protocol, and the number of transmit antennas is obtained based on a sounding packet.

20. A closed-loop signaling method over multiple channels in a telecommunication system including a wireless transmitter, comprising:
obtaining antenna information based on a beamforming protocol from a bitstream;
determining transmission power loading per channel for asymmetric antenna configuration; and
transmitting the information bit stream from the transmitter via said multiple channels over a plurality of transmit antennas according to the power loading levels,
wherein the number of transmit antennas is obtained based on a sounding packet.

* * * * *